(12) United States Patent
Ambrosetti

(10) Patent No.: US 12,728,859 B2
(45) Date of Patent: Sep. 8, 2026

(54) VEHICLE PLATOONING

(71) Applicant: AUDI AG, Ingolstadt (DE)

(72) Inventor: Sebastien Ambrosetti, Waidhofen (DE)

(73) Assignee: Audi AG, Ingolstadt (DE)

( * ) Notice: Subject to any disclaimer, the term of this patent is extended or adjusted under 35 U.S.C. 154(b) by 65 days.

(21) Appl. No.: 18/792,263

(22) Filed: Aug. 1, 2024

(65) Prior Publication Data

US 2025/0042403 A1 Feb. 6, 2025

(30) Foreign Application Priority Data

Aug. 3, 2023 (DE) ......................... 102023120574.9

(51) Int. Cl.
*B60W 30/18* (2012.01)
*B60W 30/12* (2020.01)

(52) U.S. Cl.
CPC ...... *B60W 30/18109* (2013.01); *B60W 30/12* (2013.01); *B60W 2554/802* (2020.02)

(58) Field of Classification Search
CPC ........... B60W 30/18109; B60W 30/12; B60W 2554/802
See application file for complete search history.

(56) References Cited

U.S. PATENT DOCUMENTS 9,165,470 B2 10/2015 Mudalige et al.
2014/0100734 A1* 4/2014 Yamashiro ............... G08G 1/22 701/23
2017/0184726 A1* 6/2017 Lee .......................... G01S 19/51
2018/0190125 A1* 7/2018 Hayee ..................... G08G 1/167
2018/0297639 A1* 10/2018 Fujii ..................... G05D 1/0246
2019/0176783 A1* 6/2019 Lim ...................... G05D 1/0293
2019/0179330 A1* 6/2019 Oniwa ..................... G08G 1/16
2019/0179340 A1 6/2019 Jeong
2020/0027355 A1* 1/2020 Sujan ....................... G08G 1/22
2020/0073408 A1* 3/2020 Kim ...................... G05D 1/0217
2020/0241541 A1* 7/2020 McCawley ........... B60W 30/16
2020/0250991 A1 8/2020 Kallenbach et al.
2021/0192958 A1* 6/2021 Xu .................... B60W 60/0027
2021/0323516 A1* 10/2021 Lee .......................... B60T 8/171
2022/0076580 A1* 3/2022 Park ....................... G08G 1/161
(Continued)

FOREIGN PATENT DOCUMENTS

CN 107719363 A * 2/2018 ......... B62D 15/0265
CN 113119971 A 7/2021
CN 113734167 A * 12/2021 ............ B60W 30/16
(Continued)

*Primary Examiner* — Redhwan K Mawari
(74) *Attorney, Agent, or Firm* — Seed Intellectual Property Law Group LLP

(57) ABSTRACT

A method for operating a vehicle convoy with at least three vehicles is disclosed and may comprise setting a first safety distance from the first vehicle is by a second vehicle, and setting a second safety distance from the second vehicle and/or from a third vehicle by at least one third vehicle, establishing communication links between control units for longitudinal and/or transverse guidance of the vehicles to adapt the longitudinal and/or transverse guidance of the second vehicle and of the at least one third vehicle to the first vehicle, and adjusting the vehicles to form a sinusoidal trajectory when a braking process of the convoy is initiated. Furthermore, a vehicle convoy is disclosed.

9 Claims, 2 Drawing Sheets

(56) References Cited

U.S. PATENT DOCUMENTS

2022/0382297 A1* 12/2022 Ramos Cantor ..... G05D 1/0287

FOREIGN PATENT DOCUMENTS

| | | | | | |
|---|---|---|---|---|---|
| CN | 114801602 | A | * | 7/2022 | ......... B60C 23/0433 |
| DE | 102012212681 | A1 | | 1/2013 | |
| DE | 102017009306 | A1 | | 4/2019 | |
| DE | 102019113724 | A1 | * | 11/2020 | .......... B60W 10/184 |
| DE | 102019214121 | A1 | | 3/2021 | |
| EP | 3865816 | A1 | * | 8/2021 | ........... G01S 13/931 |
| JP | 2013067302 | A | | 4/2013 | |

* cited by examiner

VEHICLE PLATOONING

BACKGROUND

Technical Field

The disclosure relates to a method for operating a vehicle convoy comprising at least three vehicles, and further relates to a vehicle convoy.

Description of the Related Art

So-called platooning or driving in a vehicle convoy is currently only being used on an experimental scale, but does enable additional energy savings. The theoretical energy savings may be in the form of fuel savings or a reduction in electrical energy consumption and depend not only on the frontal area or the drag coefficient of vehicles but also on the distance between the vehicles in the vehicle convoy. It is advantageous to keep the distance between the vehicles in the vehicle convoy as small as possible. The vehicles may be linked to one another via so-called platooning and thus communicate with one another in real time to transmit steering and braking commands. This communication may be implemented via FAS systems and car2X communication.

The choice of distance between the vehicles in the convoy represents a compromise between safety against rear-end collisions and energy savings. The distance between the vehicles in the convoy must be set as small as possible so that the energy savings from slipstreaming are exploited. However, emergency braking by the leading vehicle must under no circumstances result in rear-end collisions between the following vehicles.

BRIEF SUMMARY

The present disclosure provides a method by which a vehicle convoy may perform a braking maneuver with optimized safety reserves.

According to one aspect of the disclosure, a method is provided for operating a vehicle convoy comprising at least three vehicles. In one step, a second vehicle sets a first safety distance from the first vehicle, and at least one third vehicle sets a second safety distance from the second vehicle and/or from a third vehicle.

Advantageously, the first vehicle may also be a preceding vehicle or a lead vehicle of the vehicle convoy. The second vehicle may be a vehicle immediately following the first vehicle. The at least one third vehicle may also follow the second vehicle or follow a third preceding vehicle or be positioned behind it in the vehicle convoy.

In a further step, communication links may be established between control units for the longitudinal guidance and/or transverse guidance of the vehicles in order to adapt the longitudinal guidance and/or transverse guidance of the second vehicle and the at least one third vehicle to the first vehicle. Depending on the configuration, a control unit of the first vehicle may also execute control commands to adapt the first safety distance to the second vehicle immediately following.

In one step, when the vehicle convoy initiates a braking process, the vehicles are adjusted to form a sinusoidal trajectory.

According to a further aspect of the disclosure, a vehicle convoy is provided which is designed to carry out a method according to the disclosure. The vehicle convoy has a first vehicle which leads the vehicle convoy or is a lead vehicle of the vehicle convoy. The first vehicle is immediately followed by a second vehicle at a first safety distance. Furthermore, the vehicle convoy has at least one third vehicle which follows the second vehicle.

A second safety distance is set between the second vehicle and a third vehicle immediately following, of the at least one third vehicle. The vehicle convoy may have several third vehicles that are positioned following the second vehicle in the vehicle convoy and between which the second safety distance is set. The respective vehicles in the vehicle convoy may be identical or same vehicles or different vehicles. The vehicles may have different dimensions and masses.

By adjusting to the sinusoidal trajectory, the vehicles may alternately approach the edges or lane boundaries within the possible lane width. This measure may increase the braking distance in the event of a braking maneuver, particularly an emergency braking maneuver. This may shorten the safety distances between the vehicles in the convoy or increase road safety by increasing the reserve in terms of braking distance.

Depending on the configuration, the respective vehicles in the vehicle convoy may have a transverse offset and/or an angular offset from one another when the sinusoidal trajectory is adjusted. This measure may further increase the braking distance, as the respective vehicles in the vehicle convoy may brake past the vehicles ahead of them and thus avoid collisions due to the offset. This also increases the braking distance in order to increase road safety.

In one exemplary embodiment, the first safety distance may be set greater than the second safety distance. This measure may compensate for the time delay in the transmission of braking commands to the following vehicles in the vehicle convoy. If the control commands from the control unit of the first vehicle are transmitted to all following vehicles, all other safety distances can be reduced equally, since no time delay in the transmission of control commands is to be expected between the third vehicles and between the second and third vehicles.

If, in an alternative configuration, the control commands are transmitted from vehicle to vehicle, it may be advantageous to increase the second safety distances or at least to adapt them to the first safety distance.

According to a further embodiment, the braking process may be initiated by the first vehicle and transmitted to the second vehicle and the at least one third vehicle via the communication links. As a result, the control unit of the first vehicle or the lead vehicle may be responsible for initiating braking processes.

According to a further exemplary embodiment, the first safety distance may be set between 1 and 20 meters by the second vehicle and/or by the first vehicle. The first safety distance may be advantageously set in such a way that the first safety distance has a safety buffer in order to compensate for transmission delays in the communication link. The first safety distance may thus result from a speed-dependent distance component, which is added or multiplied by the safety buffer.

The speed-dependent distance component may, for example, be a distance which is calculated depending on the vehicle speed and at least one parameter or vehicle parameters, such as, for example, total mass, tire pressure, ambient temperature, weather, in order to control the vehicle to a standstill without a collision with a preceding vehicle of it in the vehicle convoy.

The safety buffer may be an absolute braking distance or distance calculated based on a current vehicle speed and a possible or usual latency of the communication link.

Alternatively, the safety buffer may also be configured as a factor that is greater than 1 and thus increases the speed-dependent distance component in order to compensate for the latency of the communication link. Such a safety buffer may, for example, be determined empirically and can depend on other parameters, such as, for example, sources of interference in the communication link, utilization of the communication link, time of day and the like.

According to a further embodiment, when braking is initiated, a sinusoidal trajectory of the vehicles in the convoy may be adjusted, which has a wavelength of two vehicle lengths and two safety distances. This measure may enable a vehicle to head for the left edge of the lane and a following and/or preceding vehicle to head for the right edge of the lane. In addition to increasing the braking distance due to cornering, such a configuration may also enable an angular offset between the vehicles to be set, which may enable a free area in the lane to the side of the preceding vehicle to be used for braking in the event of emergency braking.

According to a further exemplary embodiment, when braking is initiated, an angular offset between the vehicles in the vehicle convoy may be used in addition to the adjusted safety distance in order to extend a possible braking distance. The use of the angular offset may enable the lane to be used even more efficiently for braking by the vehicles in the vehicle convoy.

According to a further embodiment, the control units of the second vehicle and of the at least one third vehicle may transmit vehicle lengths and/or vehicle masses to the control unit of the first vehicle in order to adapt at least one parameter of the sinusoidal trajectory. This transmission may enable accumulation of relevant data of the vehicles of the vehicle convoy in the control unit of the first vehicle and enables centralized trajectory planning, which may be provided to the following vehicles of the vehicle convoy.

The sinusoidal trajectory used for braking may be calculated in advance and provided to all vehicles in the convoy in order to minimize the amount of data to be transmitted in the event of a braking maneuver. The sinusoidal trajectory may advantageously be recalculated at regular intervals.

Alternatively or additionally, changing lanes or roadways may be detected and used as a trigger to recalculate the sinusoidal trajectory.

According to a further exemplary embodiment, a lane width of a lane that the vehicle convoy travels on may be measured by at least one sensor and/or received from a database. Preferably, the sinusoidal trajectory may be adjusted by at least one control unit in such a way that the vehicles are steered to an edge of the lane at local maxima or minima of the sinusoidal trajectory. The vehicles may be steered at local maxima or minima of the sinusoidal trajectory in such a way that they do not drive laterally beyond the lane boundary or a lane edge.

Figure 1:
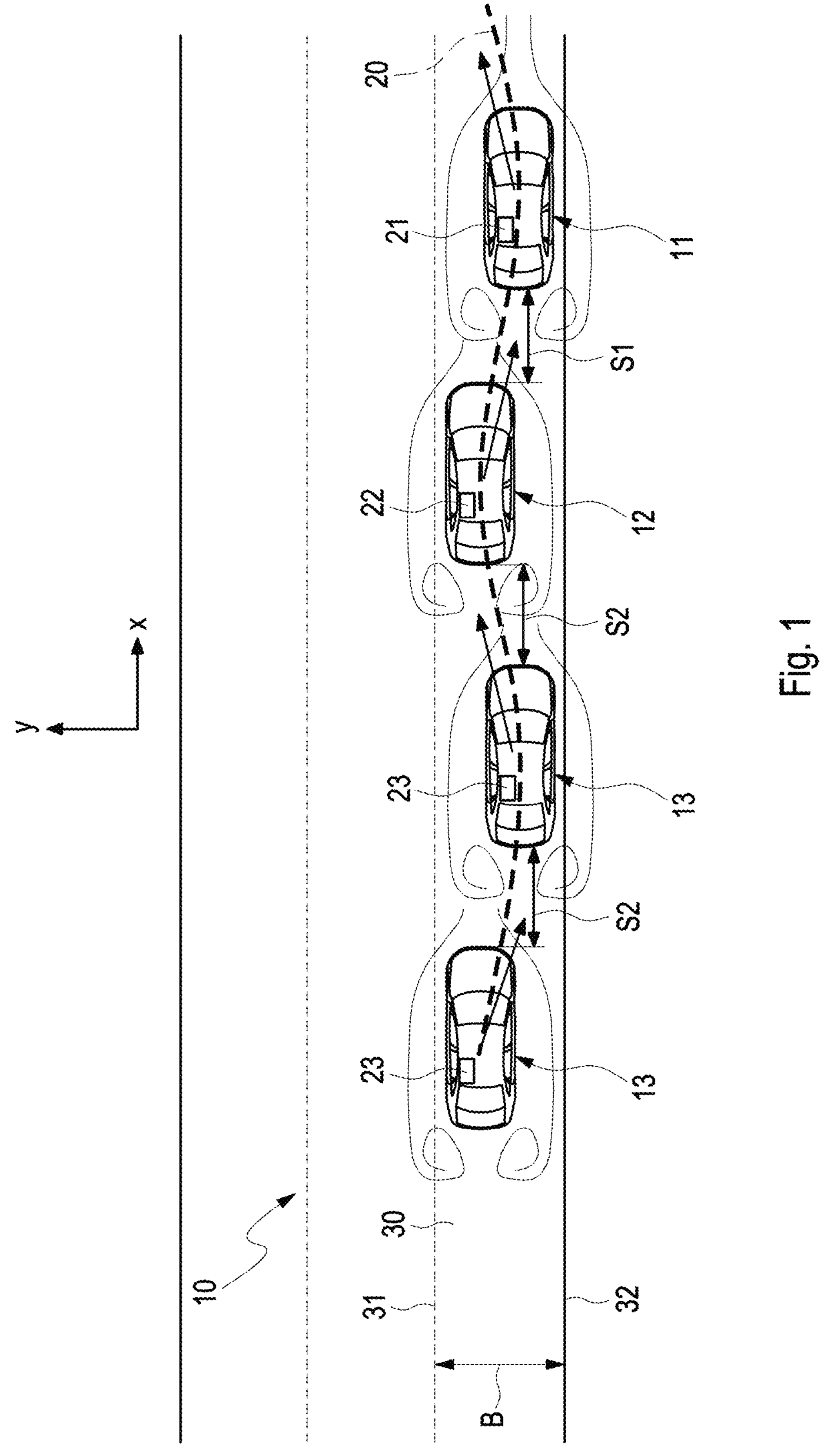
FIG. 1 shows a schematic plan view of a vehicle convoy.

In the figures, identical reference numerals indicate the same elements or structural components. The sizes and relative positions of the elements in the figures are not necessarily shown to scale. Some elements may, for example, be shown enlarged and positioned in an adjusted manner for the sake of clarity.

DETAILED DESCRIPTION

FIG. 1 shows a schematic plan view of a vehicle convoy 10 according to an exemplary embodiment according to the disclosure. Vehicle convoy 10 may be configured to carry out a method according to the disclosure. In particular, the method according to the disclosure is explained in more detail in the context of the description of vehicle convoy 10.

Vehicle convoy 10 has a first vehicle 11, which leads vehicle convoy 10 or is a lead vehicle of vehicle convoy 10. The first vehicle 11 is immediately followed by a second vehicle 12 at a first safety distance S1.

Furthermore, vehicle convoy 10 has at least one third vehicle 13, which follows second vehicle 12 or another third vehicle 13. In the illustrated exemplary embodiment, two third vehicles 13 are shown for the sake of clarity.

A second safety distance S2 may be set between second vehicle 12 and the at least one third vehicle 13. The same second safety distance S2 may also be adjusted between the two third vehicles 13.

Respective vehicles 11, 12, 13 in vehicle convoy 10 may be identical or same vehicles or different vehicles. Vehicles 11, 12, 13 may have different dimensions and masses.

When transmitting steering commands and braking commands for longitudinal and transverse guidance by control units 21, 22, 23 of vehicles 11, 12, 13, run times and latencies from the sensory detection of an obstacle in leading vehicle 11 to the processing of the information, for example in the Electronic Braking System (EBS) by the control units or braking system actuators in following vehicles 12, 13, must be taken into account when setting safety distances S1, S2.

Since the control commands are transmitted simultaneously via communication links (not shown) between control unit 21 of first vehicle 11 and control units 22, 23 of the following vehicles, first safety distance S1 may be set, for example, larger than second safety distance S2.

Safety distances S1, S2 may be defined, by way of example only, in the longitudinal direction X and space apart respective vehicles 11, 12, 13 of vehicle convoy 10 from one another. FIG. 1 shows vehicle convoy 10 during an initiated braking maneuver in which vehicles 11, 12, 13 are adjusted to form a sinusoidal trajectory 20. The air turbulence of vehicles 11, 12, 13 is illustrated by way of example with the directions of travel (indicated by arrows).

By setting sinusoidal trajectory 20, a vehicle 12 may steer to a left lane edge 31 and a following and/or preceding vehicle 11, 13 to a right lane edge 32. In addition to increasing the braking distance due to cornering, this may also enable an angular offset between vehicles 11, 12, 13 to be set, through which a free area on lane 30 to the side of preceding vehicle 12, 11 may be used for braking in the event of emergency braking.

Figure 2:
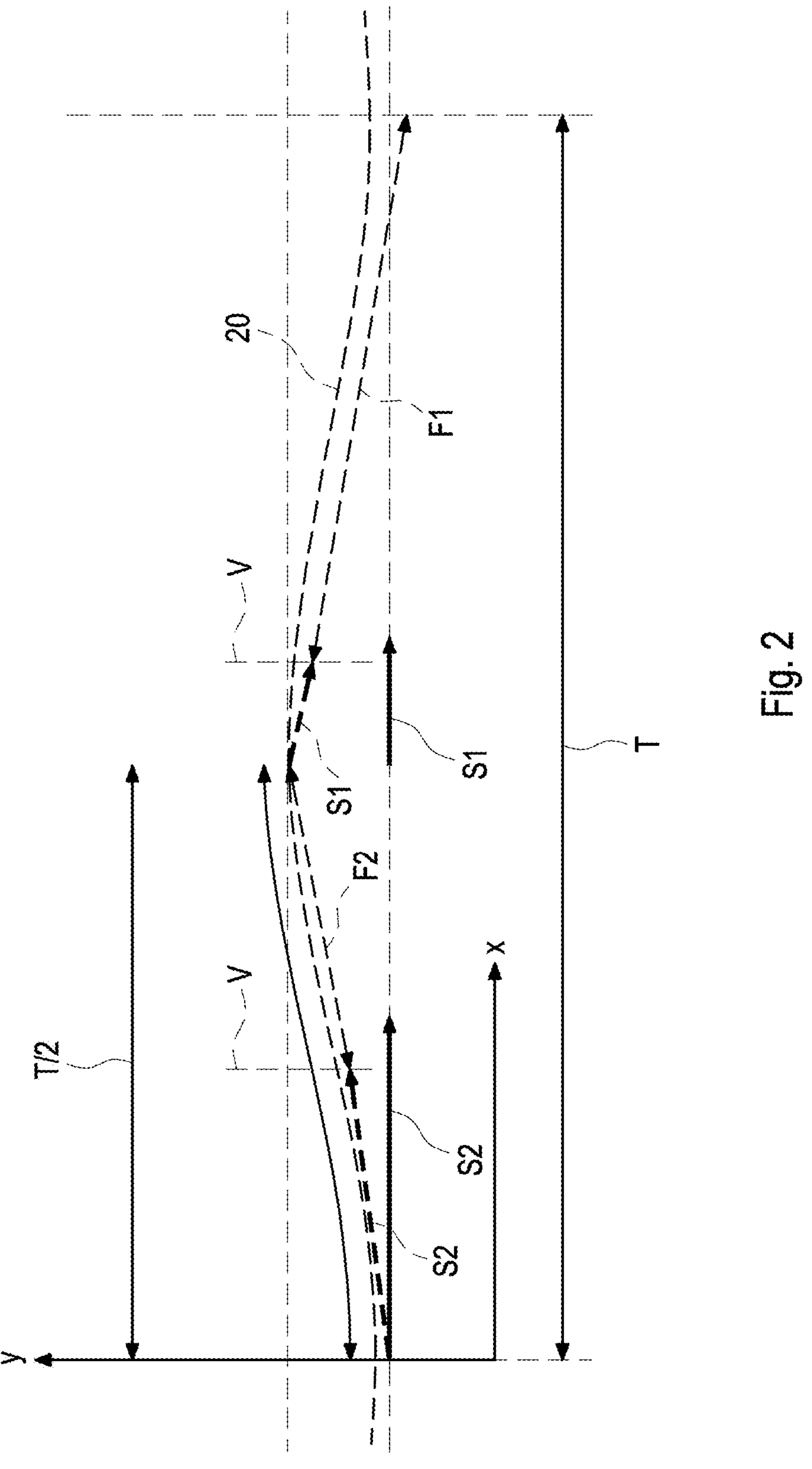
FIG. 2 shows a diagram illustrating a reduction in the distances between vehicles while maintaining the same safety distances.

When a braking process is initiated, such a sinusoidal trajectory 20 of vehicles 11, 12, 13 of vehicle convoy 10 may be adjusted, which forms a wavelength T of two vehicle lengths F1, F2 and two safety distances S1, S2 arranged one behind the other. Corresponding vehicle lengths F1, F2 are shown in FIG. 2 together with safety distances S1, S2 along sinusoidal trajectory 20. The dashed arrows show vehicle lengths F1, F2 and safety distances S1, S2 during adjusted sinusoidal trajectory 20. When sinusoidal trajectory 20 is formed as shown in FIG. 2, safety distances S1, S2 between vehicles 11, 12, 13 may be set particularly low in order to maximize energy savings. Alternatively, wavelength T can also be formed by vehicle lengths F1, F2 and safety distances S1, S2 along longitudinal direction X in order to increase the actual distances between vehicles 11, 12, 13 when cornering along sinusoidal trajectory 20.

Vertical lines V illustrate a difference in safety distances S1, S2 between regular straight-ahead travel and cornering (indicated by dashed arrows) along sinusoidal trajectory 20.

A lane width B of a lane 30 that is traveled by vehicle convoy 10 may be measured by at least one sensor (not shown) and/or received from a database. Preferably, sinusoidal trajectory 20 may be adjusted by at least one control unit 21 of first vehicle 11 such that, at local maxima or minima of sinusoidal trajectory 20, vehicles 11, 12, 13 are steered to an edge 31, 32 of lane 30. The vehicles may be steered at local maxima or minima of sinusoidal trajectory 20 such that they do not drive laterally beyond the lane boundary or a lane edge 31, 32.

German patent application no. 102023120574.9, filed Aug. 3, 2023, to which this application claims priority, is hereby incorporated herein by reference, in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for operating a vehicle convoy with at least three vehicles, comprising:

setting a first safety distance from the first vehicle by a second vehicle; and setting a second safety distance from the second vehicle by a third vehicle immediately following the second vehicle, and/or a second safety distance between the third vehicle and a fourth vehicle immediately following the third vehicle;

establishing communication links between control units for longitudinal and/or transverse guidance of the vehicles to adapt the longitudinal and/or transverse guidance of the second vehicle and of the third vehicle to the first vehicle;

adjusting the vehicles to form a sinusoidal trajectory when a braking process of the vehicle convoy is initiated; and adjusting steering of each of the first vehicle, the second vehicle, and the third vehicle to vary lateral positions of the first vehicle, the second vehicle, and the third vehicle relative to each other such that the first vehicle, the second vehicle, and third vehicle collectively form a sinusoidal trajectory when a braking process of the vehicle convoy is initiated.

2. The method according to claim 1, wherein the first safety distance is set greater than the second safety distance.

3. The method according to claim 1, wherein the braking process is initiated by the first vehicle and transmitted to the second vehicle and the third vehicle via the communication links.

4. The method according to claim 1, wherein the first safety distance is set between 1 and 20 meters by the second vehicle and/or by the first vehicle, wherein the first safety distance has a safety buffer to compensate for transmission delays of the communication links.

5. The method according to claim 1, further comprising adjusting a sinusoidal trajectory of the vehicles of the vehicle convoy when a braking process is initiated, the sinusoidal trajectory having a wavelength of two vehicle lengths and two safety distances, or the sinusoidal trajectory forming a wavelength of two vehicle lengths and safety distances angled by cornering along the sinusoidal trajectory.

6. The method according to claim 1, further comprising using an angular offset between the vehicles of the vehicle convoy when a braking process is initiated to extend a possible braking distance.

7. The method according to claim 1, further comprising transmitting vehicle lengths and/or vehicle masses to the control unit of the first vehicle by the control units of the second vehicle and of the third vehicle to adapt at least one parameter of the sinusoidal trajectory.

8. The method according to claim 1, further comprising:

measuring a lane width of a lane traveled by the vehicle convoy by at least one sensor and/or received from a database; and adjusting the sinusoidal trajectory such that at local maxima or minima of the sinusoidal trajectory the vehicles are steered to an edge of the lane.

9. A vehicle convoy having at least three vehicles configured to carry out a method for operating the vehicle convoy, the method comprising:

setting a first safety distance from the first vehicle by a second vehicle; and setting a second safety distance from the second vehicle by a third vehicle immediately following the second vehicle, and/or a second safety distance between the third vehicle and a fourth vehicle immediately following the third vehicle;

establishing communication links between control units for longitudinal and/or transverse guidance of the vehicles to adapt the longitudinal and/or transverse guidance of the second vehicle and of the third vehicle to the first vehicle;

adjusting the vehicles to form a sinusoidal trajectory when a braking process of the vehicle convoy is initiated; and adjusting steering of each of the first vehicle, the second vehicle, and the third vehicle to vary lateral positions of the first vehicle, the second vehicle, and the third vehicle relative to each other such that the first vehicle, the second vehicle, and third vehicle collectively form a sinusoidal trajectory when a braking process of the vehicle convoy is initiated.

* * * * *